Feb. 12, 1924.

E. E. GARNER 1,483,295

POULTRY HOUSE

Filed Aug. 9, 1922    2 Sheets-Sheet 1

E. E. Garner
INVENTOR

BY Victor J. Evans
ATTORNEY

WITNESS: H. A. La Clair

Feb. 12, 1924.  
E. E. GARNER  
POULTRY HOUSE  
Filed Aug. 9, 1922  
1,483,295  
2 Sheets-Sheet 2

E. E. Garner  
INVENTOR  
BY Victor J. Evans  
ATTORNEY

WITNESS: H. A. LaClair

Patented Feb. 12, 1924.

1,483,295

UNITED STATES PATENT OFFICE.

EDWARD E. GARNER, OF JACUMBA, CALIFORNIA.

POULTRY HOUSE.

Application filed August 9, 1922. Serial No. 580,732.

*To all whom it may concern:*

Be it known that I, EDWARD E. GARNER, a citizen of the United States, residing at Jacumba, in the county of San Diego and State of California, have invented new and useful Improvements in Poultry Houses, of which the following is a specification.

My present invention has reference to improvements in poultry houses.

The primary object of the invention is to produce a means whereby a poultry house can be effectively cleaned without necessitating the operator entering the said house.

The foregoing, and other objects which will present themselves as the nature of the invention is better understood, may be accomplished by a construction, combination and operative association of parts such as is disclosed by the drawings which accompany and which form part of this application.

In the drawings:—

Figure 1:
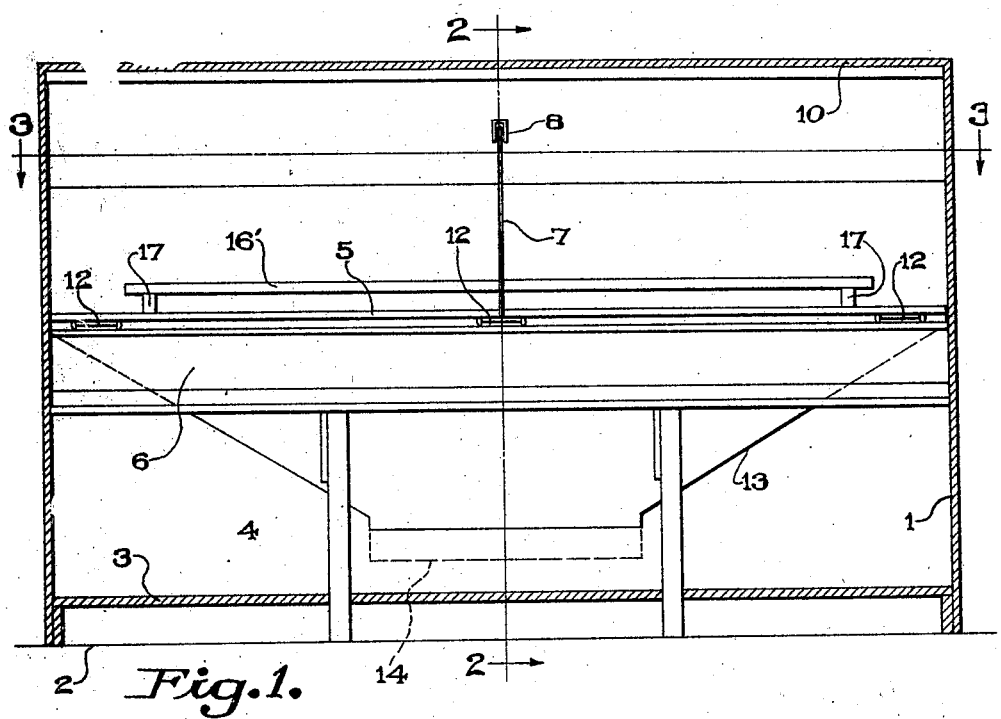
Figure 1 is an approximately central longitudinal sectional view through a poultry house provided with the improvement.

The poultry house, indicated broadly by the numeral 1, may be and preferably is of the ordinary construction. The ground level of the poultry house is indicated by the numeral 2, the floor level by the numeral 3, and for distinction, the rear wall is indicated by the numeral 4. The droppings board is hingedly supported a suitable distance below the roof of the house adjacent to the rear wall 4, and is indicated by the numeral 5. The droppings board 5 is disposed, when in normal position, over the nests 6. The droppings board 5 has connected thereto flexible elements such as cords or cables 7 which are trained over suitable pulleys 8 and 9, the former being secured to the under face of the roof 10 on the interior of the house 1 and the latter being secured to the roof exterior of the house and adjacent the rear wall 4. In the showing of the drawings, there is connected to the free end of the flexible elements 7 a weight 11, but in poultry houses that are comparatively large in size the flexible element may be wound around a drum and the shaft of the drum may be turned by a suitable lever.

I have stated that the droppings board is hinged to the rear wall 4 of the poultry house, but, as a matter of fact, the said board is hingedly secured, as at 12 to the front wall of a chute 13 which is V-shaped in plan. The chute 13 has its upper and widened open end of a width equalling that of the droppings board 5 and its lower narrow end terminates in an outwardly directed downwardly inclined receptacle 14, the said receptacle passing through the wall 4 of the house 1. This receptacle has its outer and open end closed by an angle lid 15 which has its upper portion hinged, as at 16, either to the chute or to the rear wall of the house 1. The angle lid, of course, opens upwardly, so that droppings delivered from the board into the chute will be directed outwardly through the receptacle 14. Suitable means may be provided for latching the door to the receptacle.

The roosts are indicated by the numeral 16' and are preferably connected directly to the board 5 through the medium of cleats 17 arranged between the said roosts and the said board.

Figure 2:
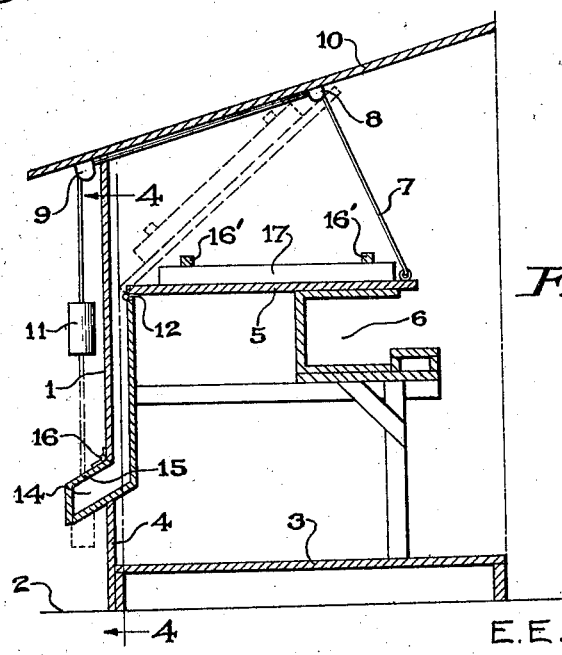
Figure 2 is a sectional view on the line 2—2 of Figure 1.
Figure 3:
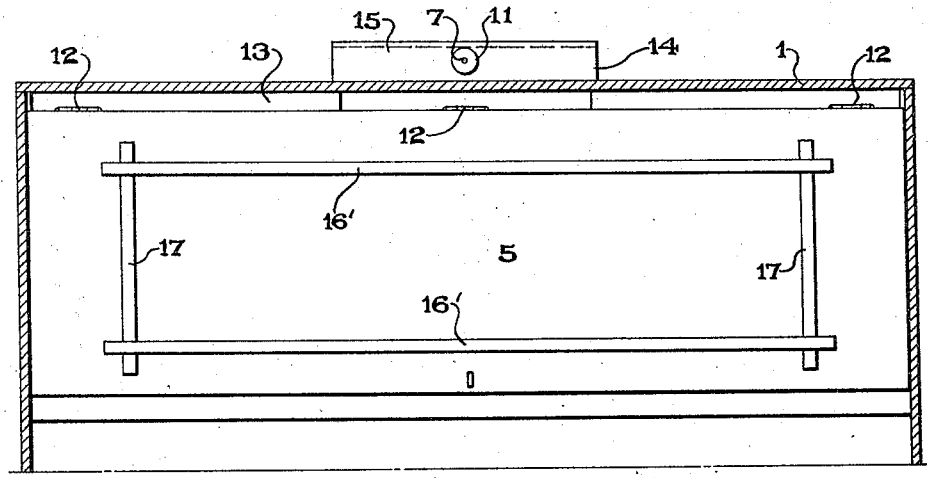
Figure 3 is a horizontal sectional view on the line 3—3 of Figure 1.
Figure 4:
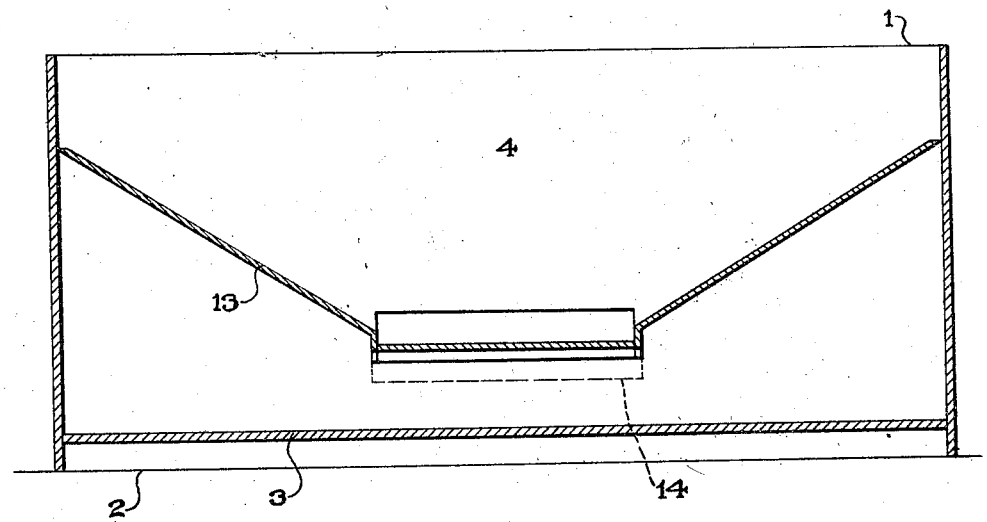
Figure 4 is a sectional view on the line 4—4 of Figure 2, looking in the direction of the arrows.

When the flexible elements 7 are operated by lever means, the pulleys 9 are connected directly to the shaft for the angle handle or lever and the flexible elements are wound therearound. Ordinarily, however, a downward pull upon the counter-balancing weights 11 will raise the roosts and droppings board 5 to the position illustrated by the dotted lines in Figure 2 of the drawings, so that droppings from the board and dirt which may have accumulated on the roosts will be directed on to the V-shaped chute 13 and from thence into the receptacle 14. By opening the door or lid 15 of the receptacle, after a wheelbarrow, cart or the like is arranged below the outlet of the said receptacle, the droppings will be deposited in such wheelbarrow or cart, and the same can be moved away from the poultry house in an easy and convenient manner.

With my improvement it will be noted that it is not necessary for an attendant to enter the poultry house to clean the same and that the said house may be retained in a clean and sanitary condition in an easy and expeditious manner, with the result that the poultryman is relieved of the obnoxious task involved in such operation and the health of the poultry will likewise be materially preserved.

The foregoing describes the manner in which a poultry house is constructed to embody my improvement, but it is, of course, to be understood that the droppings board is adapted for use in poultry houses already erected. In some instances it may be necessary to fasten the chute to the droppings board away from the rear wall, as some poultry houses are built with the droppings board and roosts a considerable distance from the walls of the housing. Again, in case the house is not the right height, it may be necessary to dispense with the inclined receptacle and deposit the droppings into a box placed directly on the floor at the end of the chute, such boxes, however, being preferably provided with an opening that communicates with the outside of the house. Still again, the droppings could be directed through a chute or the like through an opening in the floor of the house, so it is to be understood that I am not to be restricted to the precise location of parts or to the details of construction as herein set forth, but am entitled to all such changes and modifications as fall within the scope of what I claim.

Having described the invention, I claim:—

1. The combination, in a poultry house, of a droppings board, a chute to which the droppings board is connected, an outlet receptacle for the chute, a closure therefor, a roost supported from the droppings board, and means normally supporting the droppings board in horizontal position and right angularly with respect to the chute, and means for swinging the board upwardly to deliver droppings therefrom into the chute.

2. The combination, in a poultry house, of a means for cleaning the same without necessitating the operator entering the house, comprising a chute arranged vertically against the rear wall of the house, said chute having a downwardly inclined receptacle at the lower end thereof and which passes through the rear wall of the house, an angle lid hinged at its top to the open outer end of the receptacle, nests in the poultry house, a droppings board hingedly connected to the upper edge of the chute and normally resting on the nests, roosts secured to but supported above the droppings board, and means connected to the droppings board and operable exteriorly of the poultry house for swinging the same upwardly to deposit the droppings therefrom into the chute.

3. The combination, in a poultry house, of a means for cleaning the same without necessitating the operator entering the poultry house, comprising a substantially V-shaped chute which is secured to the rear wall of the house, said chute having a downwardly inclined receptacle at its lower end which passes through the rear wall of the poultry house, an angle cover hinged at its upper edge closing the open outer end of the chute, means for latching the cover to the receptacle, nests in the house, a droppings board hingedly secured to the upper edge of the chute and normally resting on the nests to cover the same, roosts supported above but secured to the droppings board, a flexible element secured to the droppings board, guide means secured to the top of the poultry house and directing the flexible means outward therefrom, and counter-balancing weights for the droppings board, and roosts secured to the outer ends of the flexible elements.

In testimony whereof I affix my signature.

EDWARD E. GARNER.